United States Patent
Murashima et al.

(10) Patent No.: US 10,020,709 B2
(45) Date of Patent: Jul. 10, 2018

(54) MOTOR HAVING A DAMPING MEMBER DISPOSED ON A MOTOR HOUSING

(71) Applicants: JTEKT CORPORATION, Osaka-shi, Osaka (JP); BRIDGESTONE KBG CO., LTD, Osaka (JP)

(72) Inventors: Tetsuya Murashima, Kashihara (JP); Kazuhiro Yamamoto, Shiki-gun (JP); Takanori Kato, Kashihara (JP); Masayuki Sekine, Okazaki (JP); Kazuyoshi Iida, Iruma (JP); Koji Sakata, Nishinomiya (JP)

(73) Assignees: JTEKT CORPORATION, Osaka (JP); BRIDGESTONE KBG CO., LTD, Osaka (JP)

( * ) Notice: Subject to any disclaimer, the term of this patent is extended or adjusted under 35 U.S.C. 154(b) by 218 days.

(21) Appl. No.: 14/970,031

(22) Filed: Dec. 15, 2015

(65) Prior Publication Data
US 2016/0190895 A1    Jun. 30, 2016

(30) Foreign Application Priority Data
Dec. 26, 2014  (JP) .................... 2014-264209

(51) Int. Cl.
| | |
|---|---|
| H02K 5/24 | (2006.01) |
| H02K 5/10 | (2006.01) |
| H02K 5/00 | (2006.01) |
| F16F 1/373 | (2006.01) |
| F16F 9/30 | (2006.01) |

(52) U.S. Cl.
CPC ............. *H02K 5/24* (2013.01); *F16F 1/3737* (2013.01); *F16F 9/306* (2013.01); *F16F 2222/025* (2013.01)

(58) Field of Classification Search
CPC ................................ H02K 5/24; H02K 7/02
USPC ........................................ 310/51, 80, 81, 90
See application file for complete search history.

(56) References Cited

U.S. PATENT DOCUMENTS

| | | | |
|---|---|---|---|
| 5,622,662 A | * | 4/1997 | Veiga ..................... B32B 5/18 156/247 |
| 5,695,867 A | | 12/1997 | Saitoh et al. |

FOREIGN PATENT DOCUMENTS

| | | | |
|---|---|---|---|
| JP | 2003299300 A | * | 10/2003 |
| JP | 2007306767 A | * | 11/2007 |

OTHER PUBLICATIONS

Jun. 9, 2016 Extended Search Report issued in European Patent Application No. 15200701.9.

* cited by examiner

*Primary Examiner* — Jose Gonzalez Quinone
(74) *Attorney, Agent, or Firm* — Oliff PLC

(57) ABSTRACT

A motor includes a motor housing, a motor body, and a damping member. The motor body includes a drive shaft. The motor body is housed in the motor housing. The damping member is disposed on an outer surface of the motor housing. The damping member includes a damping layer and a constraining layer. The damping layer is made of an organic polymeric material, and bonded to the outer surface of the motor housing. The constraining layer is made of at least one of a resin mixed with an inorganic compound and an elastomer mixed with an inorganic compound. The constraining layer is disposed on the damping layer.

6 Claims, 11 Drawing Sheets

MOTOR HAVING A DAMPING MEMBER DISPOSED ON A MOTOR HOUSING

INCORPORATION BY REFERENCE

The disclosure of Japanese Patent Application No. 2014-264209 filed on Dec. 26, 2014 including the specification, drawings and abstract is incorporated herein by reference in its entirety.

BACKGROUND OF THE INVENTION

1. Field of the Invention

The invention relates generally to a motor, and more specifically to a motor including a damping member.

2. Description of Related Art

Damping members that are attached to motor housings in which motor bodies are housed are conventionally known. Such a damping member reduces the vibrations of a motor housing caused by the operation of a motor body. Examples of such damping members include damping members of unconstrained-type and damping members of constrained-type.

A damping member of unconstrained-type includes only a damping layer. The damping layer is disposed on a surface of a motor housing. The damping member of unconstrained-type converts vibration energy into thermal energy to reduce vibrations, using expanding deformation of the damping layer.

A damping member of constrained-type includes a damping layer and a constraining layer. For example, Japanese Patent Application Publication No. 2003-299300 (JP 2003-299300 A) describes a damping member of constrained-type including a damping layer and a constraining layer laminated on the damping layer. In the damping member, a surface of the damping layer is constrained by the constraining layer, so that the damping layer undergoes shear deformation. Thus, vibration energy is converted into thermal energy in the damping layer, whereby vibrations are reduced.

According to JP 2003-299300 A, the material of a constraining layer is preferably steel or aluminum. However, when a constraining layer is made of metal, it is difficult to uniformly bond a damping layer of a damping member to a motor housing that is not flat. Especially when appropriate bonding cannot be ensured between the damping layer and the motor housing, shear deformation of the damping layer is less likely to occur. As a result, vibrations of the motor housing are not effectively reduced, and high structure-borne noise may be generated.

In general, when a damping member is bonded to a motor housing, the damping member becomes a heat insulator and thus the temperature in the motor housing increases easily. In JP 2003-299300 A, the thickness of a damping member is set small to improve the efficiency of heat dissipation from the motor housing. However, it is difficult to achieve sufficient heat dissipation efficiency by adjusting the thickness of the damping member while maintaining sufficient damping performance.

SUMMARY OF THE INVENTION

The invention provides a motor configured to achieve higher heat dissipation efficiency while reducing structure-borne noise.

A motor according to an aspect of the invention includes a motor body, a motor housing, and a damping member. The motor body includes a drive shaft. The motor body is housed in the motor housing. The damping member is disposed on an outer surface of the motor housing. The damping member includes a damping layer and a constraining layer. The damping layer is made of an organic polymeric material, and bonded to the outer surface of the motor housing. The constraining layer is made of at least one of a resin mixed with an inorganic compound and an elastomer mixed with an inorganic compound. The constraining layer is disposed on the damping layer.

According to the above aspect, the base material of the constraining layer is at least one of the resin and elastomer. Thus, the constraining layer has flexibility, and the constraining layer and the damping layer are appropriately bonded together. Thus, the damping layer easily undergoes shear deformation, so that the efficiency of conversion from vibration energy into thermal energy improves. As a result, it is possible to effectively reduce vibrations of the motor housing and structure-borne noise.

In general, a constraining layer is recognized to be used to cause shear deformation of a damping layer. Therefore, there has been no idea of improving the heat dissipation efficiency using the configuration of a constraining layer. However, the persons who have proposed the motor according to the above aspect pay attention to the facts that the temperature of the motor housing is likely to increase due to the operation of the motor body and that the thermal conductivity of conventional damping members is low, and give the constraining layer itself a heat dissipation function. In other words, according to the above aspect, the thermal conductivity of the constraining layer is improved by mixing the inorganic compound in at least one of the resin and elastomer used to form the constraining layer. Thus, the constraining layer efficiently dissipates the heat generated in the motor housing. This improves the efficiency of heat dissipation from the motor housing.

Further, the specific gravity of the constraining layer is increased by forming the constraining layer from at least one of the resin mixed with an inorganic compound and the elastomer mixed with an inorganic compound. Thus, it is possible to reduce vibrations of the motor housing and structure-borne noise.

In the motor according to the above aspect, the resin may be polyvinyl chloride.

In this configuration, the constraining layer is made of polyvinyl chloride having a relatively high specific gravity. Thus, it is possible to effectively reduce vibrations of the motor housing and structure-borne noise.

In the motor according to the above aspect, the inorganic compound may contain barium sulfate.

In this configuration, the constraining layer is made of at least one of the resin containing barium sulfate and the elastomer containing barium sulfate. Thus, it is possible to increase the thermal conductivity and specific gravity of the constraining layer. As a result, it is possible to improve the efficiency of heat dissipation from the motor housing, thereby reducing vibrations of the motor housing and structure-borne noise.

In the motor according to the above aspect, the thermal conductivity of the constraining layer may be 0.5 W/mK or higher.

In this configuration, the constraining layer has a high thermal conductivity of 0.5 W/mK or higher. Thus, it is possible to ensure sufficient heat dissipation function of the constraining layer.

In the motor according to the above aspect, the specific gravity of the constraining layer may be within a range from 2.0 to 2.5.

In this configuration, the constraining layer has a high specific gravity that falls within the range from 2.0 to 2.5. Thus, it is possible to more reliably reduce vibrations of the motor housing and structure-borne noise.

In the motor according to the above aspect, the motor housing may have a cylindrical portion and a bottom portion that closes a first axial end of the cylindrical portion, the damping member may have an opening located at a center portion of the damping member, and the damping member may be disposed on the bottom portion, at a position at which the opening is aligned with a first axial end of the drive shaft.

In this configuration, a part of the motor housing, where the first end axial end of the drive shaft is disposed, is not covered with the damping member. Thus, it is possible to reliably dissipate the heat generated at a portion near the drive shaft in the motor housing.

With the motor according to the above aspect, it is possible to improve the heat dissipation efficiency while reducing the structure-borne noise.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
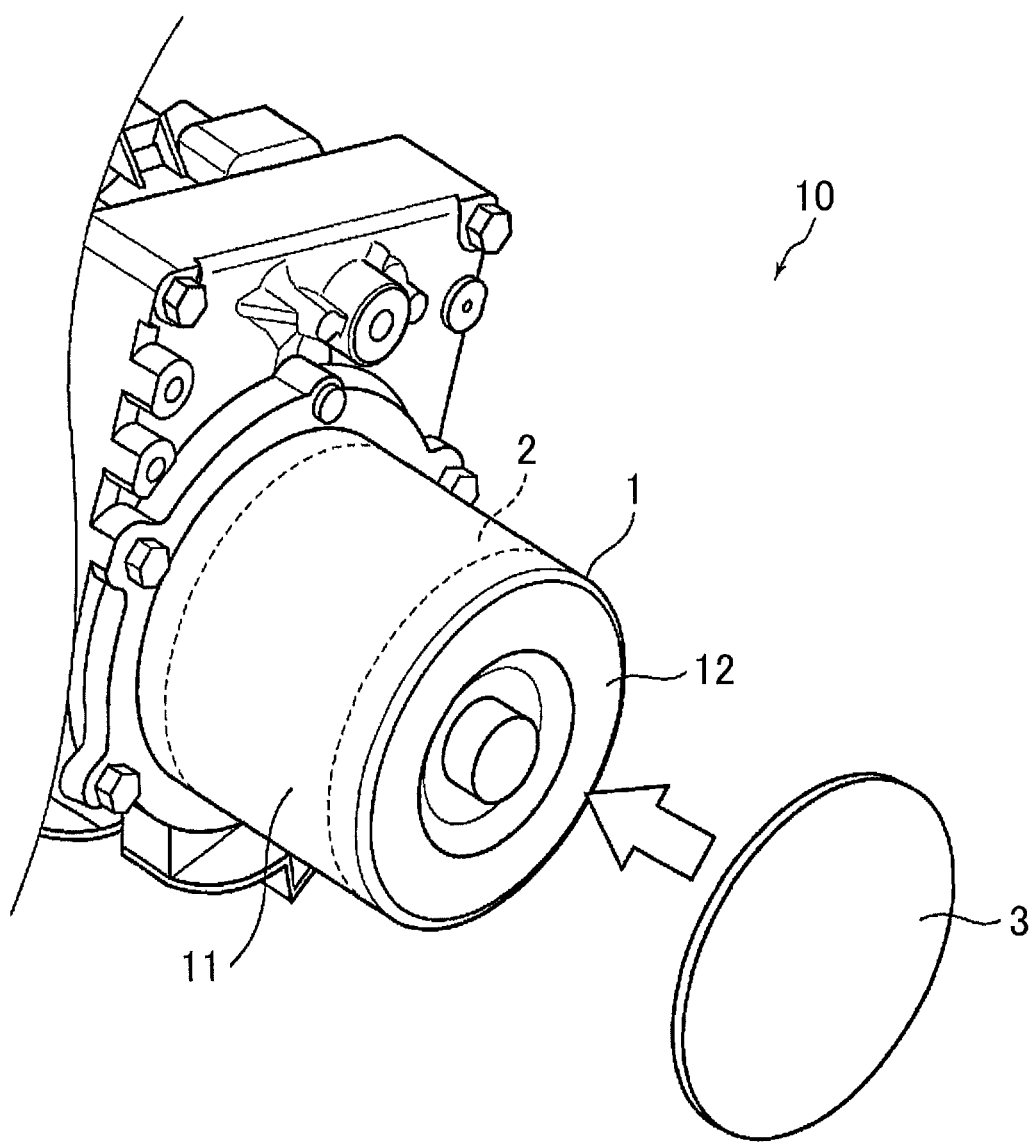
FIG. 1 is a perspective view of a motor according to a first embodiment of the invention.

Hereinafter, example embodiments of the invention will be described with reference to the accompanying drawings. The same or substantially the same configurations in the drawings will be denoted by the same reference symbols, and detailed description thereof will be provided only once. For convenience of description, the configuration will be simplified or schematically illustrated, or part of the configuration will be omitted, in each of the drawings.

First, the overall configuration of a motor 10 in a first embodiment of the invention will be described below. As illustrated in FIG. 1, the motor 10 includes a motor housing 1, a motor body 2, and a damping member 3.

Figure 2:
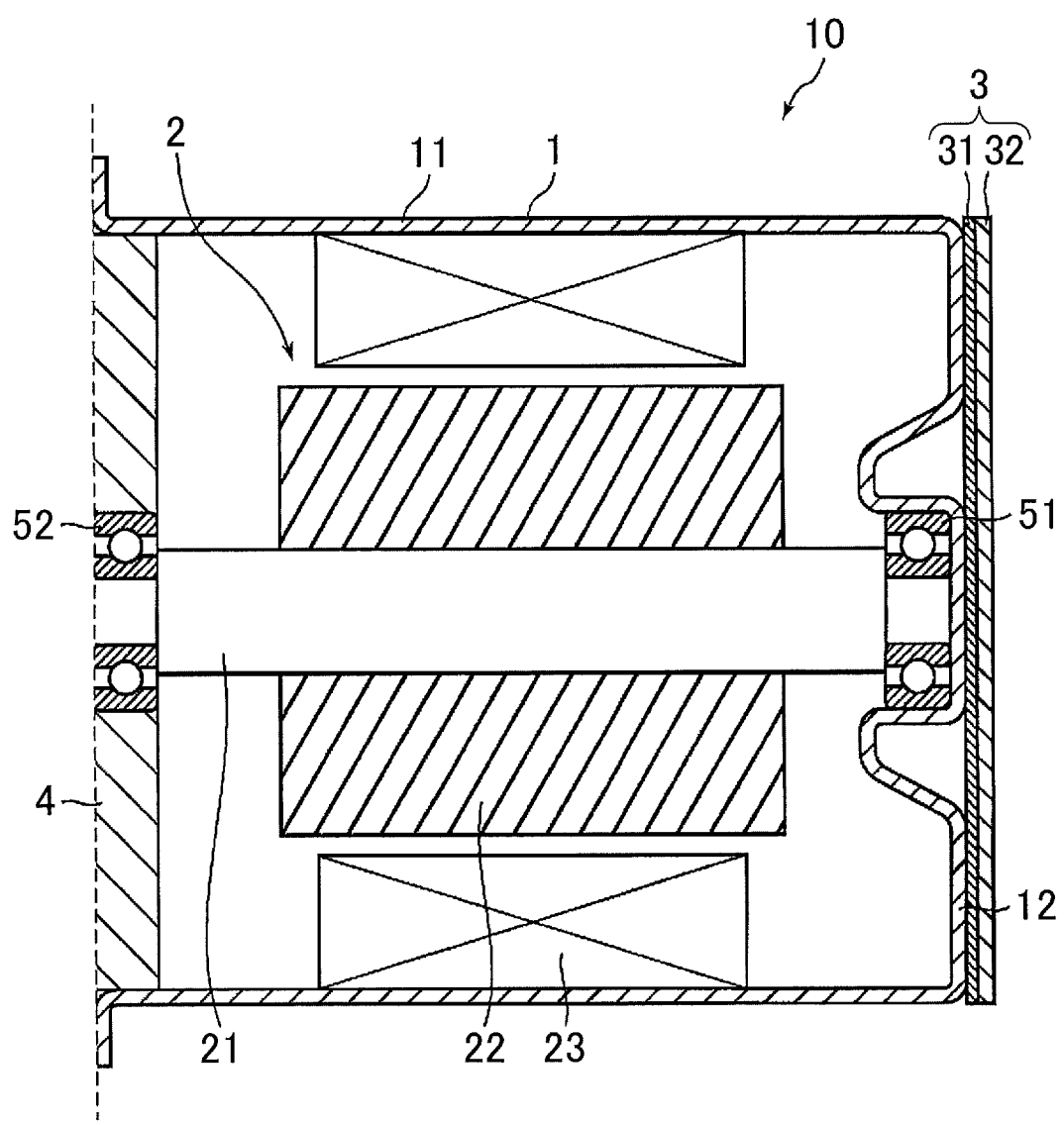
FIG. 2 is a sectional view of the motor in FIG. 1 taken along the axial direction of a drive shaft of the motor.

As illustrated in FIG. 1, the motor housing 1 has a cylindrical portion 11 and a bottom portion 12. The bottom portion 12 closes a first axial end of the cylindrical portion 11. As illustrated in FIG. 2, a second axial end of the cylindrical portion 11 is closed by a pump housing 4. The pump housing 4 houses, for example, a pump (not illustrated) driven by the motor body 2.

As illustrated in FIG. 2, the motor body 2 is housed in the motor housing 1. The motor body 2 includes a drive shaft 21, a rotor 22, and a stator 23.

The drive shaft 21 extends in the axial direction of the cylindrical portion 11. The drive shaft 21 is rotatably supported by bearings 51, 52. The bearing 51 is attached to the bottom portion 12. The bearing 52 is attached to the pump housing 4. The drive shaft 21 extends through the pump housing 4 and is connected to the pump (not illustrated) in the pump housing 4.

The rotor 22 is fixed to the drive shaft 21. The stator 23 is fixed to the inner surface of the cylindrical portion 11. The stator 23 is disposed to face the rotor 22. The stator 23 is provided with coils (not illustrated) to which driving currents are supplied. When electric currents are supplied to the coils of the stator 23, a rotating magnetic field is generated and the rotor 22 rotates together with the drive shaft 21. The driving currents are controlled by a controller (not illustrated), such as an electronic control unit (ECU).

The damping member 3 is disposed on the outer surface of the motor housing 1. The damping member 3 in the present embodiment is bonded to the outer surface of the bottom portion 12. The damping member 3 has a disk shape. The diameter of the damping member 3 is substantially equal to the diameter of the bottom portion 12. That is, the damping member 3 covers almost the entirety of the outer surface of the bottom portion 12.

The damping member 3 includes a damping layer 31 and a constraining layer 32. The constraining layer 32 is laminated on the damping layer 31.

The damping layer 31 is bonded to the bottom portion 12 of the motor housing 1. The damping layer 31 is bonded also to the constraining layer 32. That is, the damping layer 31 functions as a bonding layer at which the damping member 3 and the motor housing 1 are bonded to each other.

The thickness of the damping layer 31 is, for example, within a range from 0.1 mm to 1 mm. The thickness of the damping layer 31 is a dimension of the damping layer 31 in the direction in which the damping layer 31 and the constraining layer 32 are laminated on each other. In the present embodiment, the axial direction of the motor housing 1 is the direction in which the damping layer 31 and the constraining layer 32 are laminated on each other.

The damping layer 31 is made of an organic polymeric material. Examples of organic polymeric materials include resins and rubbers, such as acrylic, rubber (e.g. non-vulcanized butyl rubber), silicon, and urethane. When a plasticizer is contained in the constraining layer 32, the organic polymeric material preferably has a resistance to plasticizer. Examples of organic polymeric materials having a resistance to plasticizer include resins, such as an acrylic resin and a silicon resin. Each of these organic polymeric materials may be used alone as the material of the damping layer 31.

Alternatively, at least two of these organic polymeric materials may be used in combination as the material of the damping layer 31.

The damping layer 31 may be formed of an organic polymeric material sheet. For example, an organic polymeric material sheet containing at least one of the above-described organic polymeric materials may be bonded to the constraining layer 32 by hot press. Thus, the damping layer 31 of the damping member 3 is formed.

The constraining layer 32 is disposed on a surface of the damping layer 31. The surface of the damping layer 31 on which the constraining layer 32 is disposed is on the opposite side of the damping layer 31 from the surface thereof bonded to the bottom portion 12. That is, the constraining layer 32 is laminated on the outer surface of the damping layer 31. The constraining layer 32 is bonded to the outer surface of the damping layer 31.

The thickness of the constraining layer 32 is, for example, 1 mm or greater, and is preferably within a range from 2 mm to 3 mm. Preferably, the thickness of the constraining layer 32 is greater than the thickness of the damping layer 31. The thickness of the constraining layer 32 a dimension of the constraining layer 32 in the direction in which the damping layer 31 and the constraining layer 32 are laminated on each other.

The constraining layer 32 is made of a resin mixed with an inorganic compound. Alternatively, the constraining layer 32 may be made of an elastomer mixed with an inorganic compound. Further alternatively, the constraining layer 32 may be made of the combination of a resin and an elastomer. In this case as well, the resin and elastomer that form the constraining layer 32 are each mixed with an inorganic compound. At least one of a resin and an elastomer is a base material of the constraining layer 32.

Examples of resins include synthetic resins and natural resins. Although the kinds of synthetic resins are not limited to any specific kinds, thermoplastic resins are preferably used. Examples of thermoplastic resins include polyvinyl chloride, polypropylene, polyethylene, and polystyrene.

Elastomers are polymer materials having rubber elasticity. Examples of elastomers include thermosetting elastomers and thermoplastic elastomers. Examples of elastomers include natural rubbers and synthetic rubbers. Examples of synthetic rubbers include isobutylene-isoprene rubber, silicon rubber, polyurethane rubber, ethylene propylene rubber, and acrylic rubber.

At least one of the resins and elastomers described above may be selected and used to form the constraining layer 32. It is preferable to select polyvinyl chloride (PVC) as a resin used to form the constraining layer 32, from the viewpoint of increasing the specific gravity of the constraining layer 32. That is, the constraining layer 32 preferably contains polyvinyl chloride. However, the kinds of resins and elastomers used to form the constraining layer 32 are not limited to any specific kinds, as long as the resins and elastomers used to form the constraining layer 32 provide the damping member 3 with a sufficiently high flexibility that allows the damping member 3 to conform to the motor housing 1.

An inorganic compound is mixed into a resin and/or an elastomer to increase the thermal conductivity and specific gravity of the constraining layer 32. The thermal conductivity of the constraining layer 32 is preferably 0.5 W/mK or higher. The specific gravity of the constraining layer 32 is preferably within a range from 2.0 to 2.5. The percentage content of the inorganic compound in the constraining layer 32 may be within a range from 30% to 70% by weight.

Although the kinds of inorganic compounds are not limited to any specific kinds, inorganic compounds containing metallic elements are preferably used. Examples of inorganic compounds include barium sulfate, calcium carbonate, alumina, magnesium hydroxide, and mica.

Inorganic compounds mixed into a resin and/or an elastomer are preferably in the powder form or in the scale-like form. In this case, the average particle size of the inorganic compound is, for example, within a range from 5 μm to 75 μm in diameter ($\phi$).

At least one of the inorganic compounds described above may be selected and mixed into a resin and/or an elastomer. From the viewpoint of increasing the thermal conductivity and specific gravity of the constraining layer 32, it is preferable that, for example, barium sulfate and calcium carbonate be mixed into a resin and/or an elastomer. However, the kinds of inorganic compounds used in the constraining layer 32 are not limited to any specific kinds, as long as the thermal conductivity and specific gravity of the constraining layer 32 are increased.

The constraining layer 32 may further contain materials other than the above-described resins, elastomers, and inorganic compounds. For example, a plasticizer may be added to the constraining layer 32. Examples of plasticizers include phthalate plasticizers, adipate plasticizers, and phosphate plasticizers.

The constraining layer 32 may be formed in the form of a sheet. That is, the constraining layer 32 may be formed by mixing at least one kind of inorganic compound into a base material containing at least one of the resins and elastomers described above, and forming the base material mixed with the inorganic compound into the form of a sheet.

Next, the function of the damping member 3 formed as described above will be described.

Figure 3:
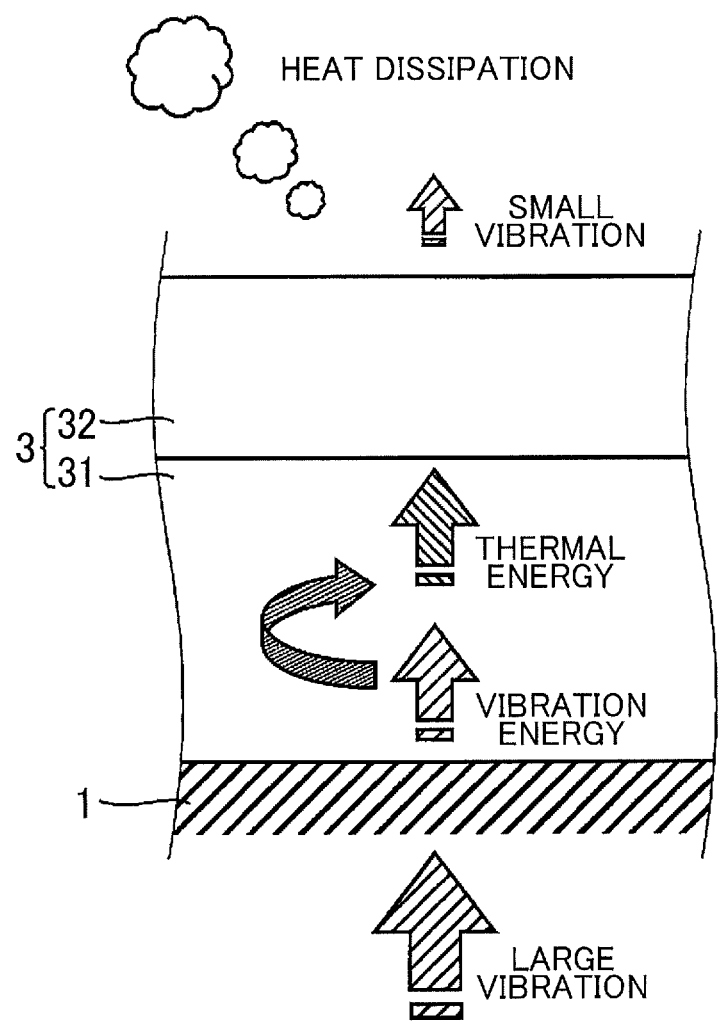
FIG. 3 is a view illustrating the functional effect of a damping member of the motor in FIG. 1.

When driving currents are supplied to the motor body 2 illustrated in FIG. 1 and FIG. 2 and the motor body 2 is driven, a motor control unit (MCU) including the motor body 2 and the ECU vibrates. The vibrations of the MCU cause vibrations of the motor housing 1. At this time, the damping layer 31 undergoes shear deformation between the motor housing 1 and the constraining layer 32. Thus, as illustrated in FIG. 3, vibration energy is converted into thermal energy in the damping layer 31, so that vibrations of the surface of the motor housing 1 are reduced. As a result, structure-borne noise transmitted through the motor housing 1 is reduced.

While the motor body 2 is operating, the temperatures of the inside and surface of the motor housing 1 easily increase due to the heat generated in the MCU. The constraining layer 32 has a high thermal conductivity due to the inorganic compound mixed in the constraining layer 32. Thus, as illustrated in FIG. 3, the constraining layer 32 promotes heat dissipation. As a result, increases in the temperatures of the inside and surface of the motor housing 1 are prevented.

Next, the advantageous effects of the first embodiment of the invention will be described. In the first embodiment described above, the constraining layer 32 of the damping member 3 is made of at least one of a resin and an elastomer, and has flexibility. Thus, the damping layer 31 of the damping member 3 is appropriately bonded to the motor housing 1. Thus, the damping layer 31 easily undergoes shear deformation between the motor housing 1 and the constraining layer 32, so that vibration energy is efficiently converted into thermal energy. As a result, it is possible to reduce vibrations of the motor housing 1, thereby reducing the structure-borne noise.

The constraining layer 32 has a heat dissipation function. That is, the constraining layer 32 is made of at least one of a resin mixed with an inorganic compound and an elastomer mixed with an inorganic compound, and thus the constraining layer 32 has a high thermal conductivity. Thus, the heat generated in, for example, the motor body 2 or the bearing 51 and transmitted to the motor housing 1 is efficiently dissipated to the outside the motor housing 1 through the constraining layer 32. This improves the efficiency of heat dissipation from the motor housing 1.

When the temperature of the inside of a motor housing is expected to increase due to the attachment of a damping member to the motor housing, design changes of bearings that support a drive shaft are usually required. In contrast to this, in the damping member 3 in the first embodiment, the constraining layer 32 promotes heat dissipation. Therefore, when the damping member 3 is attached to the motor housing 1, increases in the temperature inside the motor housing 1 are rather prevented. Thus, design changes of the bearings 51, 52 in the motor housing 1 are less likely to be required.

In general, damping members made of polymer materials are less likely to produce the damping effect at high temperature due to their high temperature dependency. In contrast to this, the constraining layer 32 of the damping member 3 in the first embodiment promotes heat dissipation, so that increases in the temperature of the motor housing 1 are prevented. Thus, the damping member 3 is able to produce the damping effect at high temperature although the damping member 3 is made mainly of a polymer material.

Because heat dissipation is promoted by the constraining layer 32 of the damping member 3, increases in the temperature inside the motor housing 1 are prevented. Thus, it is possible to prevent heat damages to the motor body 2, other mechanical elements, and an electric circuit stored in the motor housing 1.

An inorganic compound is mixed into a resin and/or an elastomer that form/forms the constraining layer 32. Therefore, the constraining layer 32 has a specific gravity higher than that in a case where the constraining layer 32 is made only of a resin and/or an elastomer. Thus, it is possible to more reliably reduce vibrations of the motor housing 1, thereby more reliably reducing the structure-borne noise.

The constraining layer 32 is preferably made of polyvinyl chloride having relatively high specific gravity. Thus, it is possible to more reliably reduce vibrations of the motor housing 1, thereby more reliably reducing the structure-borne noise.

Preferably, barium sulfate is mixed into a resin and/or an elastomer that form/forms the constraining layer 32. Due to barium sulfate, it is possible to reliably increase the thermal conductivity and specific gravity of the constraining layer 32. This makes it possible to further improve the efficiency of heat dissipation from the motor housing 1. Further, it is possible to more reliably reduce vibrations of the motor housing 1, thereby more reliably reducing the structure-borne noise.

The thermal conductivity of the constraining layer 32 is preferably 0.5 W/mK or higher. Due to such a high thermal conductivity of the constraining layer 32, the constraining layer 32 sufficiently fulfills its heat dissipation function.

The specific gravity of the constraining layer 32 is preferably within a range from 2.0 to 2.5. Due to such a high specific gravity of the constraining layer 32, it is possible to more reliably reduce vibrations of the motor housing 1, thereby more reliably reducing the structure-borne noise.

Figure 4:
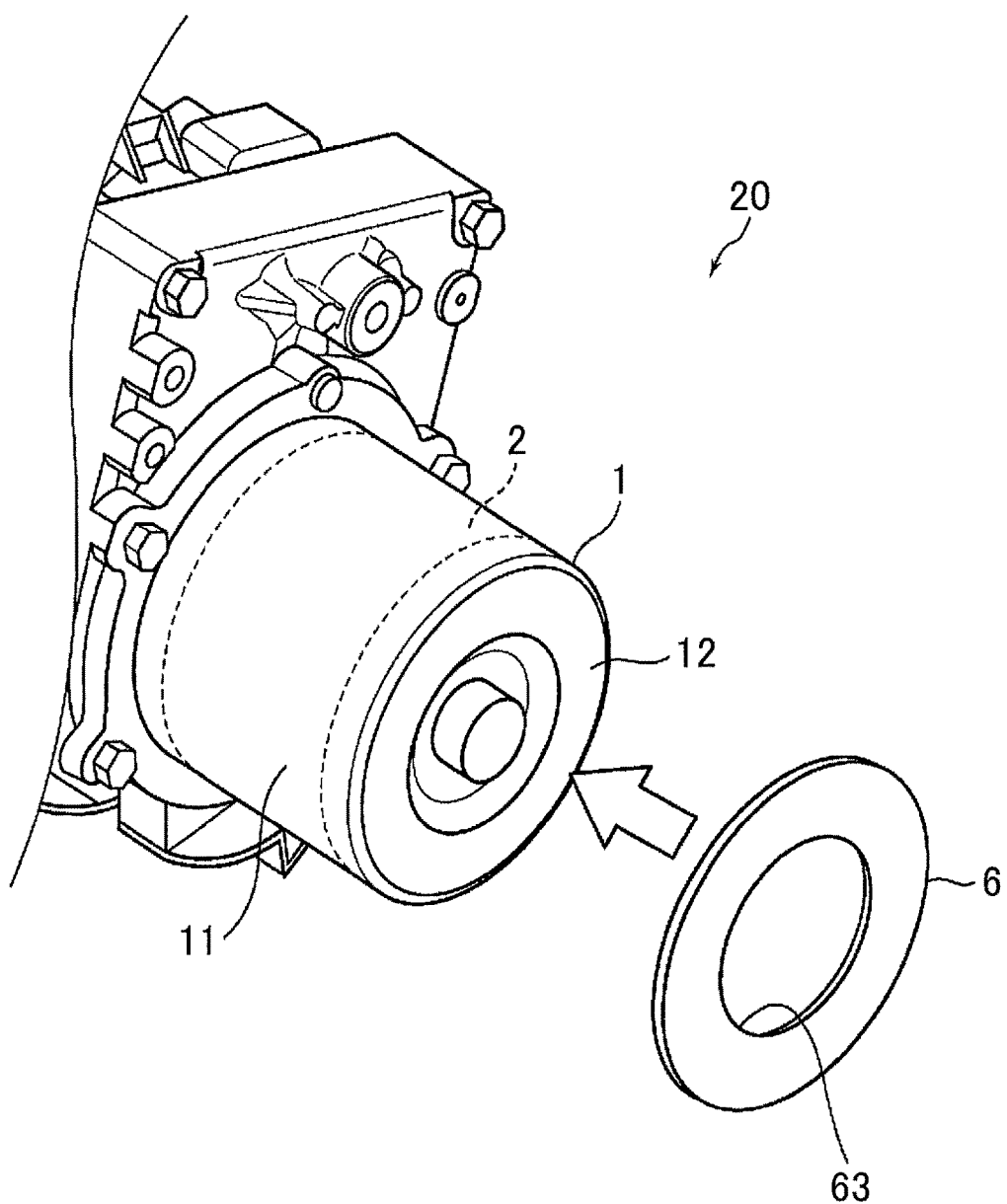
FIG. 4 is a perspective view of a motor according to a second embodiment of the invention.

Next, a motor 20 according to a second embodiment of the invention will be described. As illustrated in FIG. 4, the motor 20 in the second embodiment includes a damping member 6. The damping member 6 has a configuration different from that of the damping member 3 in the first embodiment. The motor 20 has the same configuration as that of the motor 10 in the first embodiment, except the damping member 6.

Figure 5:
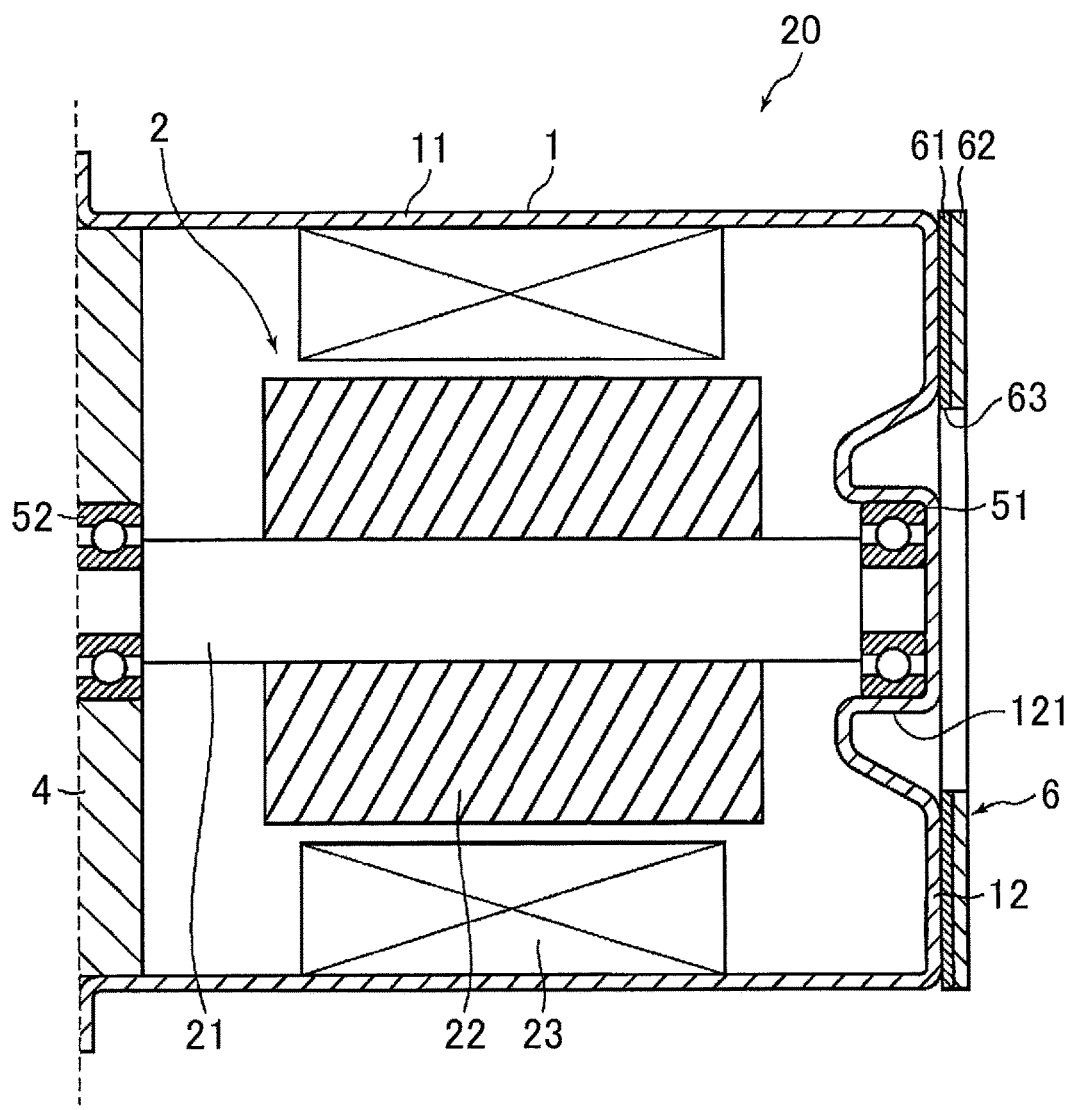
FIG. 5 is a sectional view of the motor in FIG. 4 taken along the axial direction of a drive shaft of the motor.

As illustrated in FIG. 5, the damping member 6 includes a damping layer 61 and a constraining layer 62. The damping layer 61 and the constraining layer 62 may be made of the same materials as those for the damping layer 31 and the constraining layer 32 of the damping member 3, respectively.

The damping member 6 has an opening 63. The opening 63 is formed in the center portion of the damping member 6. The opening 63 is a through-hole that passes through the damping layer 61 and the constraining layer 62 in the laminated direction. That is, the damping member 6 has an annular shape.

The damping member 6 is bonded to the bottom portion 12 of the motor housing 1. The outer diameter of the damping member 6 is substantially equal to the diameter of the bottom portion 12. The opening 63 is located at the center portion of the bottom portion 12. The damping member 6 is disposed on the bottom portion 12, at a position at which the opening 63 is aligned with the first axial end of the drive shaft 21. That is, a recessed portion 121 of the bottom portion 12 is not covered with the damping member 6. The recessed portion 121 is formed in the bottom portion 12 so as to surround the position where the first axial end of the drive shaft 21 and the bearing 51 are disposed.

Next, the advantageous effects of the second embodiment of the invention will be described. In the motor 20 in the second embodiment of the invention, the recessed portion 121 is formed in the bottom portion 12 of the motor housing 1 so as to surround the position where the first axial end of the drive shaft 21 and the bearing 51 are disposed, and the recessed portion 121 is not covered with the damping member 6. Thus, no heat-insulating layer of air is formed between the motor housing 1 and the damping member 6, so that the heat generated in the drive shaft 21 and the bearing 51 is easily dissipated from the bottom portion 12. Thus, the efficiency of heat dissipation from the motor housing 1 is further improved.

While the example embodiments of the invention have been described above, the invention should not be limited to the foregoing embodiments and various changes may be made to the foregoing embodiments within the scope of the invention.

In the foregoing embodiments, the damping member has a diameter that is substantially equal to the diameter of the bottom portion of the motor housing. However, the damping member may have a diameter that is smaller than the diameter of the bottom portion. That is, the damping member may be provided to cover part of the outer surface of the bottom portion. Further, the shape of the damping member is not limited to a disk-shape or an annular shape.

In the foregoing embodiments, the damping member is disposed on the bottom portion of the motor housing. However, the position of the damping member is not limited to any particular position. For example, the damping member may be disposed on the cylindrical portion of the motor housing, or may be disposed on each of both the cylindrical portion and the bottom portion. When the shape of the motor housing is not a bottomed cylindrical shape, the position of the damping member is not limited to any particular position. The damping member needs to be disposed on an outer surface of the motor housing.

The motor body described in each embodiment is just one example of a motor body. Various kinds of motor bodies may be selected as needed and used in the invention.

Hereinafter, examples of the motors according to the disclosure will be described in detail.

CONFIRMATION OF NOISE-REDUCTION EFFECT EXAMPLE 1

As a damping member in Example 1, a damping member having the same configuration as that of the damping member 3 (see FIG. 1) having a disk-shape in the first embodiment was prepared. A damping layer of the damping member was made of acrylic resin. A constraining layer of the damping member was made of polyvinyl chloride mixed with barium sulfate. The percentage content of barium sulfate in the constraining layer was 49% to 54% by weight. The specific gravity of the constraining layer was 2.4, and the thermal conductivity of the constraining layer was 0.56 W/mK.

The damping member in Example 1 was bonded to a bottom portion of a motor housing. The motor housing provided with the damping member was hung and hit and the generated noise was measured at ordinary temperature (about 20° C.), at high temperature (about 90° C.), and at low temperature (about −40° C.).

COMPARATIVE EXAMPLE 1

The motor housing provided with no damping member was hung and hit and the generated noise was measured at ordinary temperature (about 20° C.), at high temperature (about 90° C.), and at low temperature (about −40° C.).

Evaluations

Figure 6:
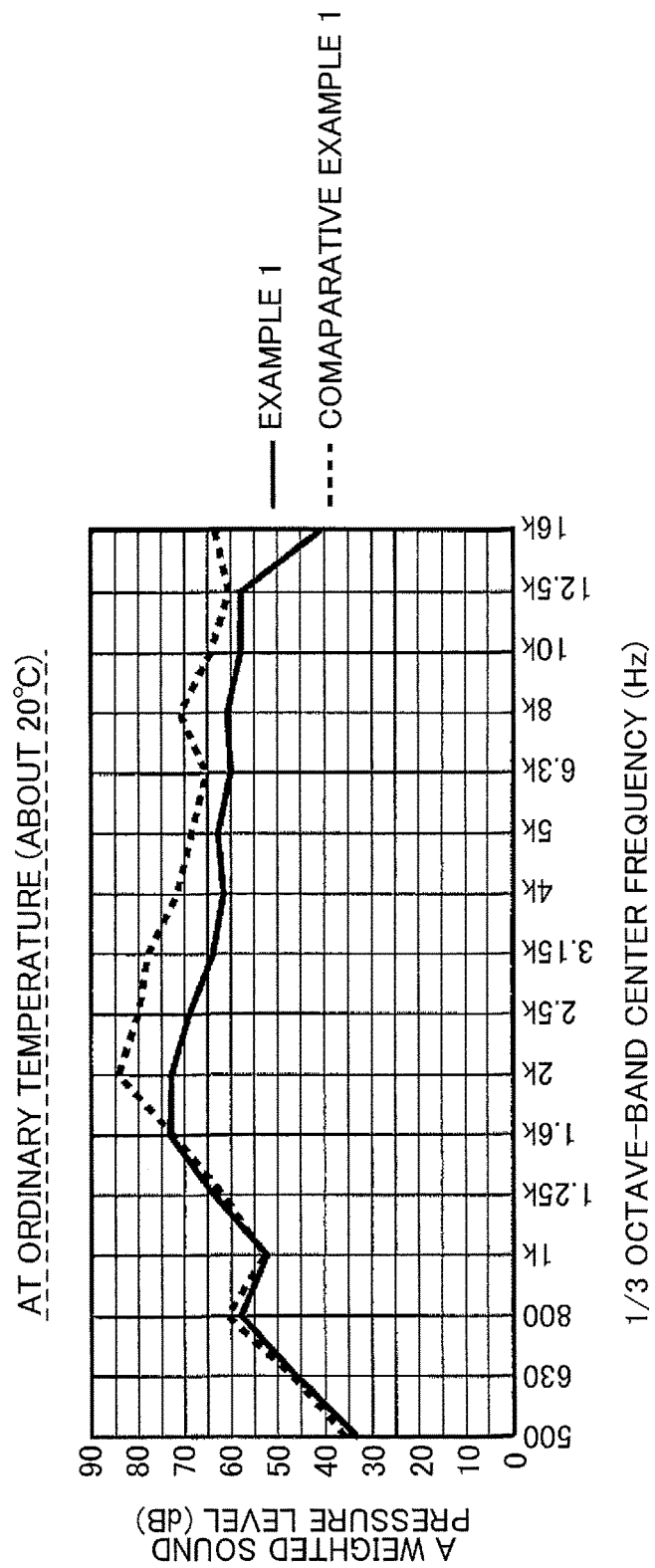
FIG. 6 is a graph illustrating the noise-reduction effect produced by a damping member in Example 1 at ordinary temperature.
Figure 7:
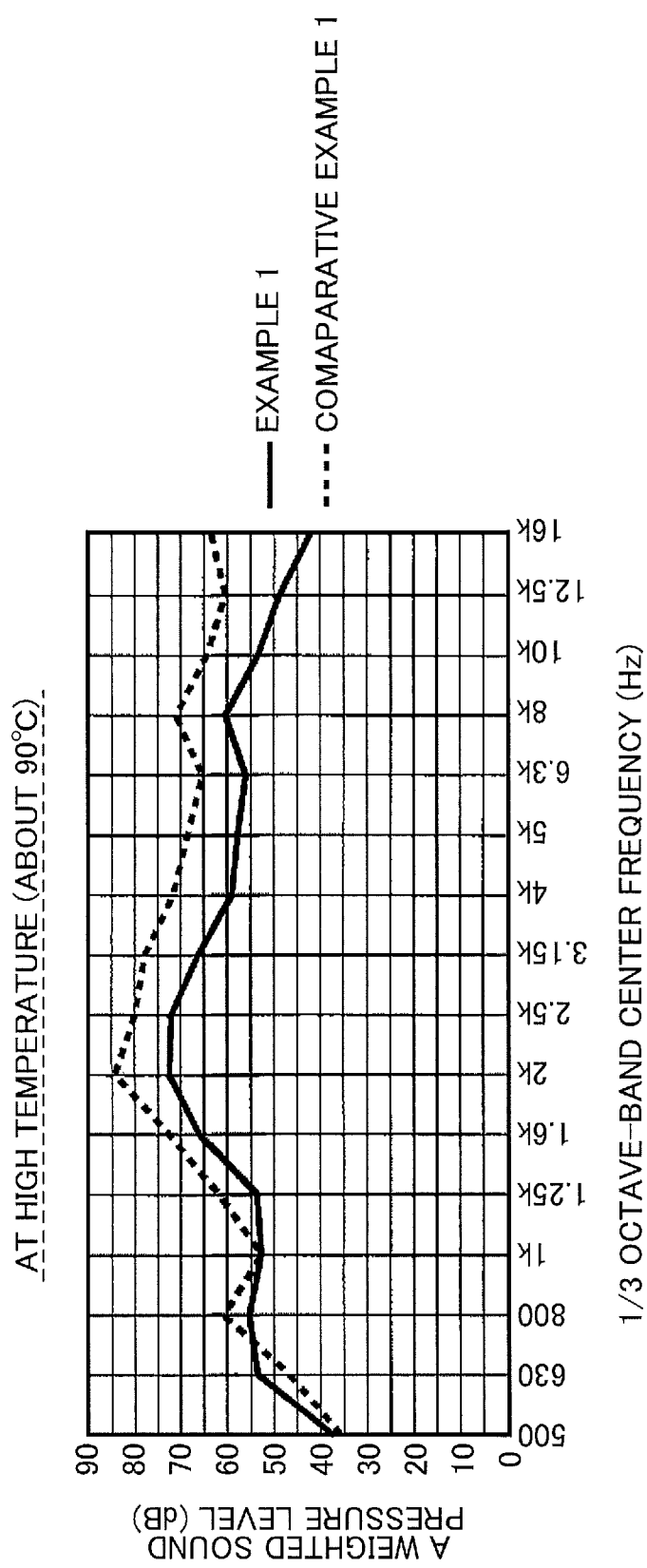
FIG. 7 is a graph illustrating the noise-reduction effect produced by the damping member in Example 1 at high temperature.
Figure 8:
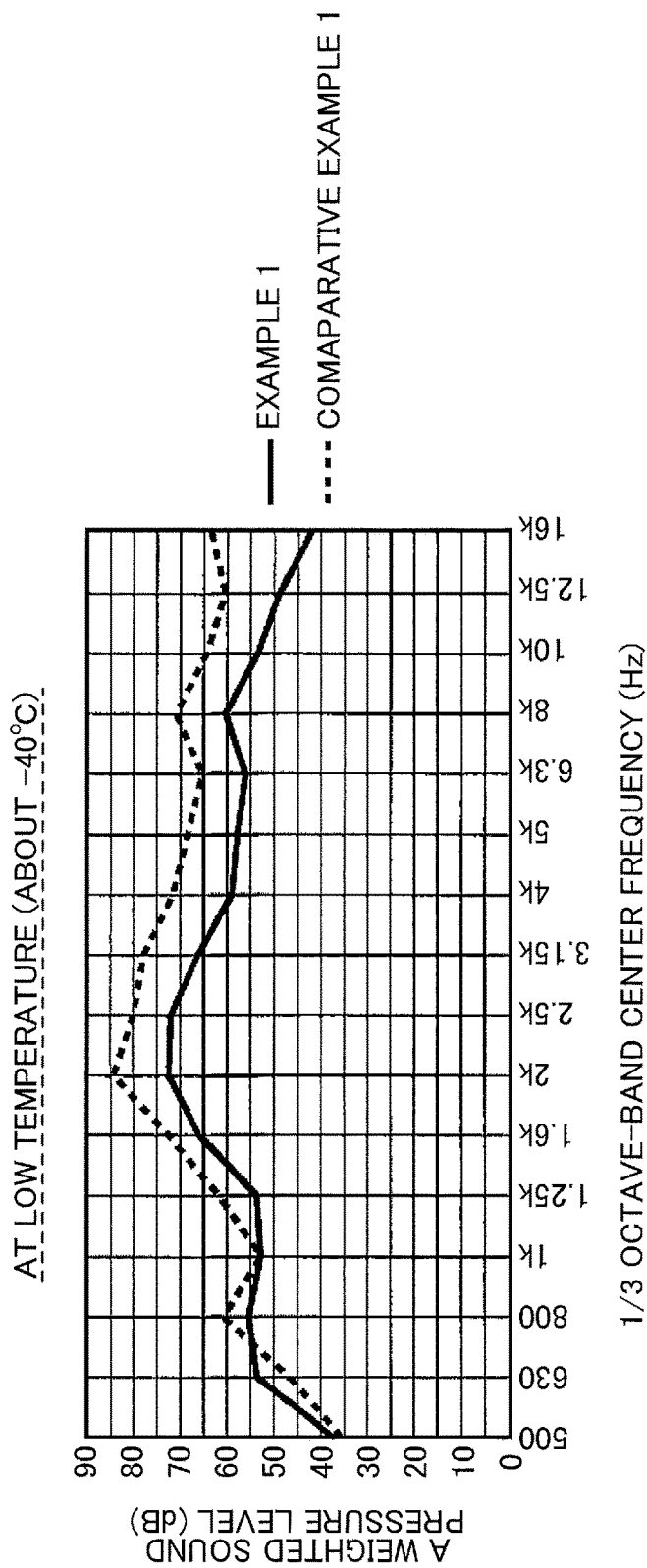
FIG. 8 is a graph illustrating the noise-reduction effect produced by the damping member in Example 1 at low temperature.

FIG. 6, FIG. 7, and FIG. 8 illustrate the results of measurements of the generated noise at ordinary temperature, at high temperature, and at low temperature, respectively. As illustrated in FIG. 6, FIG. 7, and FIG. 8, the measured noise in Example 1 was lower than the measured noise in Comparative Example 1 in all the temperature ranges. The results indicate that the damping member in Example 1 makes it possible to reduce the structure-borne noise of the motor housing regardless of the temperature range.

CONFIRMATION OF NOISE-REDUCTION EFFECT EXAMPLE 2

Figure 9:
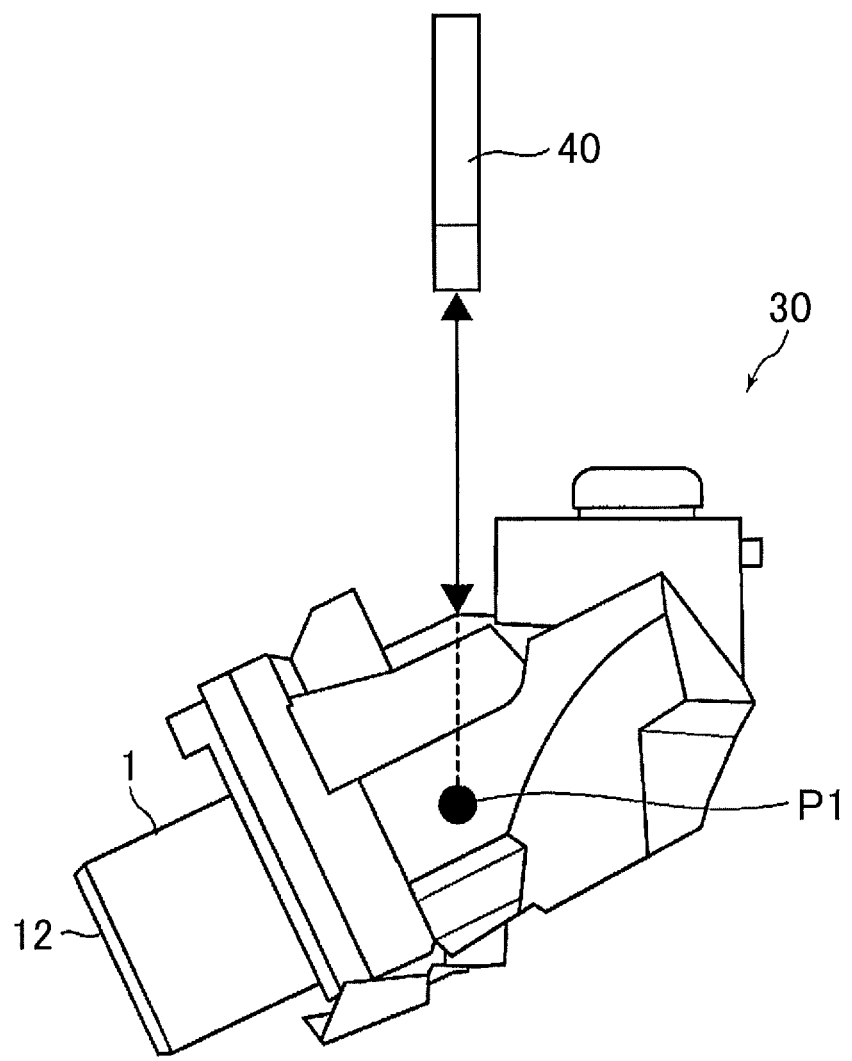
FIG. 9 is a view illustrating a method of measuring the noise generated in a power unit in Example 2.

As illustrated in FIG. 9, an electric pump 30 (manufactured by JTEKT Corporation, part number: JF201-00250A) was prepared. A damping member in Example 2 was bonded to a bottom portion 12 of a motor housing 1. The damping member in Example 2 had the same configuration as that of the damping member 6 (see FIG. 4) having an annular shape in the second embodiment. A damping layer of the damping member was made of acrylic resin. A constraining layer of the damping member was made of polyvinyl chloride mixed with barium sulfate. The percentage content of barium sulfate in the constraining layer was 49% to 54% by weight. The specific gravity of the constraining layer was 2.4, and the thermal conductivity of the constraining layer was 56 W/mK.

A motor body in the motor housing 1 was operated in a state where the electric pump 30 was hung. A microphone 40 was disposed at a position over an end surface of the electric pump 30, which is located over the center P1 of the electric pump 30. Then, the noise generated in the electric pump 30 was measured.

Table 1 indicates the test results. As indicated in Table 1, the noise generated in the electric pump 30 was measured under Test Conditions 1 to 4.

TABLE 1

|  | Test Condition 1 | Test Condition 2 | Test Condition 3 | Test Condition 4 |
|---|---|---|---|---|
| Sweep Rotation Speed (min$^{-1}$) | 1,000 → 5,000 | 1,000 → 4,300 | 1,000 → 3,100 | 1,000 → 2,800 |
| Load Pressure (MPa) | 0.17 → 1.7 | 1.0 → 6.0 | 2.3 → 9.0 | Common Condition |
| Oil Temperature | 60 ± 5° C. | | | |
| Voltage | 13.5 V | | | |

COMPARATIVE EXAMPLE 2

The noise generated in the electric pump 30 was measured in the same method and under the same test conditions as those in Example 2. However, in Comparative Example 2, a damping member was not bonded to the bottom portion 12 of the motor housing 1.

Evaluations

⅓ octave band analysis and tracking analysis (order component: gear engagement primary component, gear engagement secondary component) were performed on the generated noise measured in Example 2 and Comparative Example 2.

The results of the ⅓ octave band analysis revealed that, under all Test Conditions 1 to 4 in Table 1, the measured noise in Example 2 was lower than the measured noise in Comparative Example 2, in the frequency band (2,230 Hz to 4,490 Hz) having a center frequency of 2,500 Hz to 4,000 Hz. Under Test Condition 1, the measured noise in Example 2 was lower than the measured noise in Comparative Example 2, also in the frequency band (1,430 Hz to 2,250 Hz) having a center frequency of 1,600 Hz to 2,000 Hz.

The results of the tracking analysis (order component: gear engagement primary component) revealed that, under Test Condition 1 in Table 1, the measured noise in Example 2 was lower than the measured noise in Comparative Example 2, in the rotation range in which the rotation speed is 4,100 min$^{-1}$ or higher (frequency: 1,705 Hz or higher).

The results of the tracking analysis (order component: gear engagement secondary component) revealed that, under all Test Conditions 1 to 4 in Table 1, the measured noise in Example 2 was lower than the measured noise in Comparative Example 2, in the rotation range in which the rotation speed is 3,040 min$^{-1}$ or higher (frequency: 2,230 Hz or higher). Under Test Condition 1, the measured noise in Example 2 was lower than the measured noise in Comparative Example 2, also in the rotation range in which the rotation speed is between 1,950 min$^{-1}$ and 2,750 min$^{-1}$ (frequency: 1,430 Hz to 2,020 Hz).

The test results revealed that the damping member in Example 2 contributed to reduction in the structure-borne noise at the electric pump 30. The damping member in Example 2 produces the prominent effect of reducing the structure-borne noise especially in the frequency band from 2,230 Hz to 4,490 Hz and in the gear engagement primary component at high speed rotation and at low load.

CONFIRMATION OF HEAT-DISSIPATION EFFECT EXAMPLE 3

Figure 10:
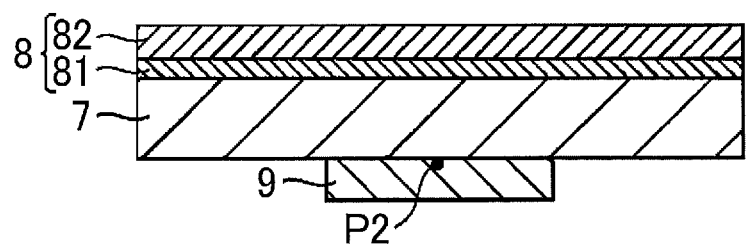
FIG. 10 is a view illustrating a method of a basic model test for evaluating the heat dissipation effect produced by a damping member in Example 3.

As illustrated in FIG. 10, a steel sheet 7 having a thickness of 1.6 mm and a damping member 8 were prepared. Like the damping members 3, 6 in the first and the second embodiments (see FIG. 1 and FIG. 4), the damping member 8 had a damping layer 81 and a constraining layer 82. The damping layer 81 was made of acrylic resin. The constraining layer 82 was made of polyvinyl chloride mixed with barium sulfate. The percentage content of the barium sulfate in the constraining layer 82 was 49% to 54% by weight. The specific gravity of the constraining layer 82 was 2.4, and the thermal conductivity of the constraining layer 82 was 0.56 W/mK.

The damping member 8 was bonded to one surface of the steel sheet 7. A heater 9 was disposed on the other surface of the steel sheet 7. The heater 9 was energized for a prescribed period, so that the steel sheet 7 was heated by the heater 9. While the heater 9 was energized, the temperature at the measurement point P2 was continuously measured. The measurement point P2 was located at the center of the surface of the heater 9, which faces the steel sheet 7.

COMPARATIVE EXAMPLE 3

In Comparative Example 3, the damping member 8 was not bonded to the steel sheet 7. The heater 9 was energized for the prescribed period, so that the steel sheet 7 provided with no damping member 8 was heated by the heater 9. While the heater 9 was energized, the temperature at the measurement point P2 was continuously measured.

EVALUATIONS

Figure 11:
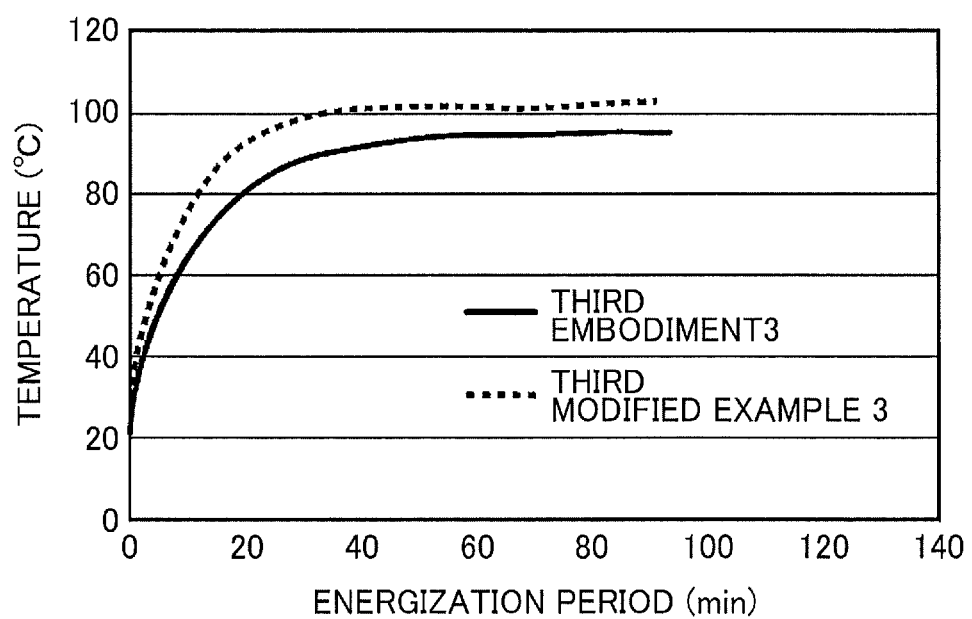
FIG. 11 is a graph indicating the heat dissipation effect produced by the damping member in Example 3.

FIG. 11 indicates the temperature at the measurement point P2 measured while the heater 9 was energized. As illustrated in FIG. 11, the measurement temperature in Example 3 was lower than the measurement temperature in Comparative Example 3 throughout the period in which the heater 9 was energized. The test results revealed that the damping member 8 produced the heat dissipation effect, that is, the damping member 8 makes it possible to lower the temperature inside the motor housing, whereas a conventional damping member increases the temperature inside the motor housing.

What is claimed is:

1. A motor comprising:
a motor body including a drive shaft;
a motor housing in which the motor body is housed; and
a damping member disposed on an outer surface of the motor housing, wherein
the damping member includes a damping layer and a constraining layer, the damping layer being made of an organic polymeric material, the damping layer being bonded to the outer surface of the motor housing, the constraining layer being made of at least one of a resin mixed with an inorganic compound and an elastomer mixed with an inorganic compound, and the constraining layer being disposed on the damping layer.

2. The motor according to claim 1, wherein the resin is polyvinyl chloride.

3. The motor according to claim 1, wherein the inorganic compound contains barium sulfate.

4. The motor according to claim 1, wherein a thermal conductivity of the constraining layer is 0.5 W/mK or higher.

5. The motor according to claim 1, wherein a specific gravity of the constraining layer is within a range from 2.0 to 2.5.

6. The motor according to claim 1, wherein
the motor housing has a cylindrical portion and a bottom portion that closes a first axial end of the cylindrical portion;
the damping member has an opening located at a center portion of the damping member; and
the damping member is disposed on the bottom portion, at a position at which the opening is aligned with a first axial end of the drive shaft.

\* \* \* \* \*